Dec. 28, 1954   W. V. WILEY   2,698,111
FLUID FLOW CONTROL MECHANISM FOR PREDETERMINED VOLUME
Filed April 25, 1952   2 Sheets-Sheet 1
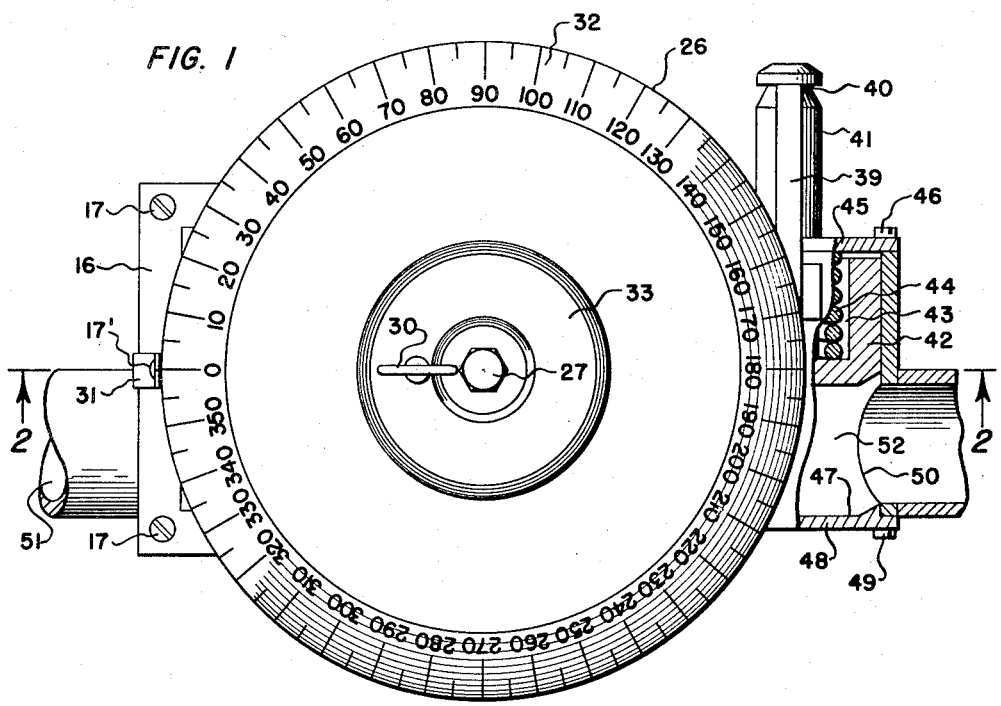
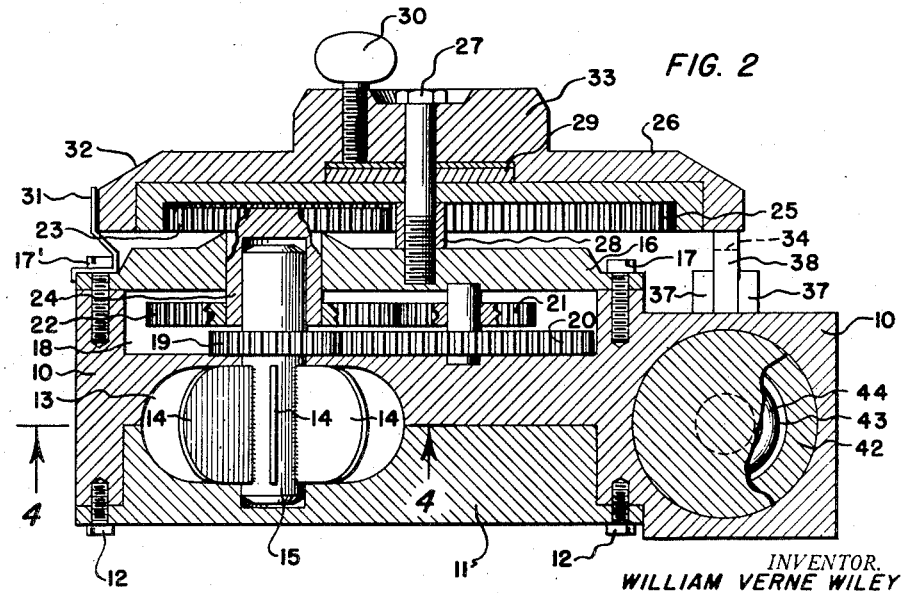
INVENTOR.
WILLIAM VERNE WILEY
BY
Wm. H. Dean
AGENT Dec. 28, 1954   W. V. WILEY   2,698,111
FLUID FLOW CONTROL MECHANISM FOR PREDETERMINED VOLUME
Filed April 25, 1952   2 Sheets-Sheet 2

INVENTOR.
WILLIAM VERNE WILEY
BY
Wm. H. Dean
AGENT

United States Patent Office 2,698,111
Patented Dec. 28, 1954

2,698,111

FLUID FLOW CONTROL MECHANISM FOR PREDETERMINED VOLUME

William Verne Wiley, San Diego, Calif.

Application April 25, 1952, Serial No. 284,422

3 Claims. (Cl. 222—20)

My invention relates to a Fluid Flow Control Mechanism for Predetermined Volume and the objects of my invention are:

First, to provide a fluid flow control mechanism having a valve of this class which will automatically shut off the flow of fluid after a predetermined time has elapsed or a predetermined amount of fluid has passed through the valve.

Second, to provide a fluid flow control mechanism having a valve of this class that may be easily set into operation without requiring the use of any tools.

Third, to provide a fluid flow control mechanism of this class having dial mechanism for shutting off the flow of fluid through the valve that may be quickly and easily engaged or disengaged from operation without interfering with the flow of fluid through the fluid valve, and;

Fourth, to provide a fluid flow control mechanism of this class which is a compact unit, easy and efficient to operate, which will not readily deteriorate or get out of order.

With these and other objects in view, as will appear hereinafter, my invention consists of certain novel features of construction, combination and arrangement of parts and portions as will be hereinafter described in detail and particularly set forth in the appended claims.

In the accompanying drawings, forming a part of this specification, and in which like numerals are employed to designate like parts throughout the same, Fig. 1 is a plan view of my fluid flow control mechanism having a shut-off valve showing a portion thereof broken away.

Fig. 2 is a vertical section taken on line 2—2 of Fig. 1.

Figure 3:
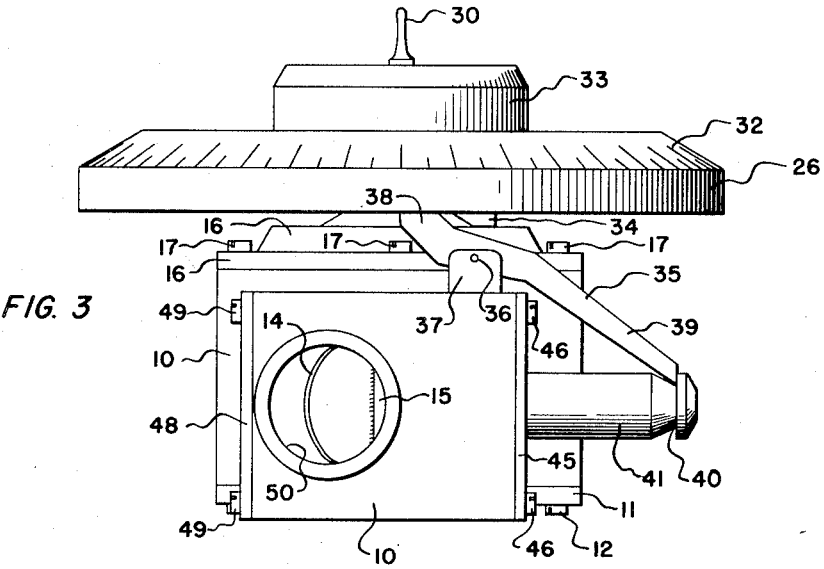
Fig. 3 is a vertical end view showing the inlet side of the shut-off valve.

In the drawings, wherein for the purpose of illustration is shown a preferred embodiment of my invention, the numeral 10 designates the casing of the automatic fluid shut-off valve. Flanged bottom plate 11 is fastened to the casing 10 by screws 12 providing a chamber 13 for the arcuate vanes 14 and a housing for the shaft 15 to which the vanes 14 are attached, thereby forming a fluid wheel. A lid 16 attached to casing 10 by screws 17 covers a space 18 for the reduction gear train made up of driving gear 19 mounted on shaft 15 and driven gears 20, 21, 22, 23 and 25. Gear 23 is provided with a hollow shank 24 journaled in lid 16 which supports the upper portion of the shaft 15. Internal gear 25 depending from the circular dial plate 26 is driven by gear 23 and provides for the rotation of dial plate 26 about the axis of bolt 27 fastened to lid 16. Support sleeve 28 and washer 29 are mounted about bolt 27. Washer 29 serves as a clutch plate for the dial plate 26 and is frictionally engageable with the top surface of inner gear 25 through pressure applied by thumb screw 30. A reference marker 31 is fastened to lid 16 by screw 17' and extends upwardly to serve as a reference pointer for the numbers on the bevel face 32 of dial plate 26. A centrally disposed boss 33 of dial plate 26 provides for ease in gripping and setting dial plate 26 to the desired position relative to the marker 31. Cam 34 is mounted on the underside of dial plate 26 and is provided with a beveled face extending upwardly in the direction of rotation of the dial under operating conditions. Lever 35 fulcrumed at pin 36 held in bracket 37 has an inclined top portion 38 and a downwardly extending portion 39 which normally engages the annular face formed by circumferential notch 40 in valve stem 41. Recessed valve disk 42 provides an annular space 43 around valve stem 41 for mounting a compression coil spring 44 which engages the inner surface of valve disk 42 and wall 45 which is fastened by screws 46 to casing 10. The inner surface 47 of wall 48 fastened to casing 10 by screws 49 provides for the seating of valve disk 42 when the valve is in the closed position. Inlet port 50 and outlet port 51 of inner pipe 52 located off center horizontally in casing 10 have suitable pipe connections provided.

Figure 4:
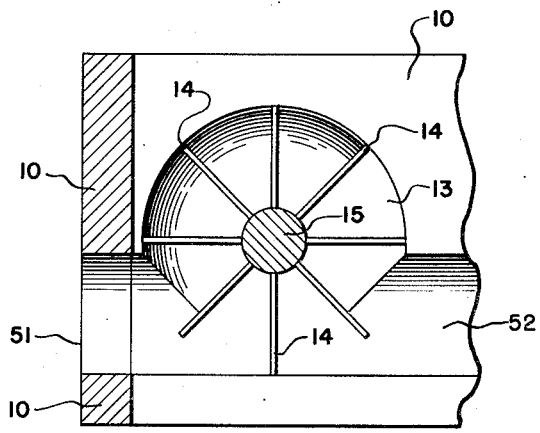
Fig. 4 is a horizontal section taken on line 4—4 of Fig. 2.

The operation of my automatic fluid flow control mechanism is substantially as follows:

The thumb screw 30 is loosened and dial plate 26 is rotated about the axis of bolt 27 by the operator gripping and twisting the boss 33 in a counterclockwise direction to the desired setting of the beveled dial face 32 relative to the reference marker 31, whereupon the thumb screw 30 is tightened, thus re-engaging the dial plate 26 with the inner gear 25 through the clutch action of washer 29. Since it is difficult to reverse the normal rotation of the reduction gear train by twisting dial plate 26 in a counterclockwise direction when it is engaged with the gear train, the simple clutch plate system of thumb screw 30 and washer 29 provides a convenient and easy means for setting the dial plate to the desired position. It will be noted that in the drawings, for the purpose of illustration, the beveled dial face 32 is numbered in angular degrees and the location of the cam 34 is such that the maximum possible operating time for any one setting is substantially 360 degrees of rotation of the dial plate. For any particular pressure and size of pipe the dial can be calibrated in terms of time, such as minutes, or in volume, such as gallons, if desired. If the dial face 32 is set for operation at the maximum value of substantially 360 degrees of rotation, the back part of the cam 34 will impinge against the front of the upper portion 38 of lever 35 relative to the direction of rotation which is always clockwise. The valve stem 41 is pulled outwardly from the wall 45 and the downwardly extending portion 39 of lever 35 is engaged with the circumferential notch 40 in valve stem 41 thereby placing compression coil spring 44 under tension and withdrawing valve disk 42 from its closed position in seat 47 to the open position as shown in Fig. 1. This allows the fluid to enter through inlet port 50 and to activate the reduction gear train before passing through outlet port 51 by acting on the fluid wheel defined by vanes 14 and shaft 15. As best shown in Figs. 3 and 4 it will be noted that the vertical shaft 15 of the fluid wheel is off-set in position relative to the longitudinal axis of inner pipe 52 allowing for energy transfer from the flowing fluid to the wheel. The rotation of the fluid wheel causes a corresponding clockwise rotation of the dial plate 26 at reduced speed. As the dial plate 26 nears the zero position, the beveled face of cam 34 engages the upper portion of lever 35 and trips the lever from engagement with valve stem 41 at the zero position whereupon the spring 44 forces the valve disk 42 forward to its closed position in seat 47 shutting off the flow of fluid.

It will be obvious from the above description and the drawings that the shut-off features of my automatic fluid shut-off valve may be circumvented by disengaging the dial plate 26 by loosening thumb screw 30. In this instance the valve stem 41 is held outwardly by lever 35 and the fluid passes through the casing 10 turning the fluid wheel shaft 15 as described previously. However, since the dial plate 26 is disengaged the cam 34 will not rotate or trip the lever 35 from its engagement with valve stem 41. At any time the automatic shut-off feature may be put in operation merely by setting the dial and tightening thumb screw 30 thereby engaging dial plate 26 with the actuating gear mechanism. It is not necessary for the operator to stop the flow of fluid as the dial may be set through this clutch arrangement without working against the force of fluid or the reduction gear train.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. An automatic fluid flow control mechanism comprising a casing having a passageway therein for fluid, a dial rotatably mounted on said casing, fluid driven means mounted in said casing having a rotating element coaxial with and adjacent to said dial, and means adjustably connecting said dial to said element, spring loaded valve means mounted in said casing for opening and closing said passageway, said spring loaded valve means so arranged under tension to be normally in the closed position, a lever pivoted on said casing adapted to engage and hold said spring loaded valve means in the open position and a cam depending from said dial so arranged to trip said lever from engagement with said spring loaded valve means at a fixed position of said dial thereby releasing said spring loaded valve means to the closed position.

2. An automatic fluid flow control mechanism as set forth in claim 1 wherein said dial comprises a dial plate, a clutch plate member between said rotating element and said dial plate, and adjustable screw means co-operating with said dial plate and said clutch plate member and element for engaging and disengaging said dial plate from driven connection with said element.

3. An automatic fluid flow control mechanism comprising a casing having a passageway therein for fluid, an adjustable dial means rotatably mounted on said casing, fluid driven means mounted in said casing having a driving connection with said adjustable dial means, spring loaded valve means mounted in said casing for opening and closing said passageway, said spring loaded valve means having a valve stem and being biased toward the closed position, a lever pivoted on said casing adapted to engage said stem directly and to hold said spring loaded valve in the open position, and a cam on said adjustable dial means so arranged to trip said lever from engagement with said stem at a fixed position of said adjustable dial means thereby releasing said spring loaded valve means to the closed position.

References Cited in the file of this patent

UNITED STATES PATENTS

| Number | Name | Date |
|---|---|---|
| 1,748,022 | Landar | Feb. 18, 1930 |
| 1,861,170 | Yates | May 31, 1932 |